US009755886B2

(12) United States Patent
Ananda et al.

(10) Patent No.: US 9,755,886 B2
(45) Date of Patent: Sep. 5, 2017

(54) TECHNIQUES FOR CONDITIONAL NAME RESOLUTION AND CONFIGURATION

(75) Inventors: Gautham Chambrakana Ananda, South Canara District (IN); Premkumar Jothimani, Namakkal (IN)

(73) Assignee: Micro Focus Software Inc., Provo, UT (US)

( * ) Notice: Subject to any disclaimer, the term of this patent is extended or adjusted under 35 U.S.C. 154(b) by 851 days.

(21) Appl. No.: 12/607,149

(22) Filed: Oct. 28, 2009

(65) Prior Publication Data

US 2011/0078292 A1 Mar. 31, 2011

Related U.S. Application Data

(60) Provisional application No. 61/247,259, filed on Sep. 30, 2009.

(51) Int. Cl.
*H04L 29/12* (2006.01)
*H04W 4/00* (2009.01)
*H04L 29/08* (2006.01)

(52) U.S. Cl.
CPC .... *H04L 29/12066* (2013.01); *H04L 61/1511* (2013.01); *H04L 67/30* (2013.01); *H04W 4/00* (2013.01)

(58) Field of Classification Search
None
See application file for complete search history.

(56) References Cited

U.S. PATENT DOCUMENTS

| 6,625,645 | B1 | | 9/2003 | Van Horne et al. |
| 6,823,460 | B1 | * | 11/2004 | Hollander ............. G06F 9/4425 710/260 |
| 7,027,582 | B2 | | 4/2006 | Khello et al. |
| 7,031,314 | B2 | * | 4/2006 | Craig et al. ................... 370/392 |
| 7,177,947 | B1 | * | 2/2007 | Herzog et al. ................ 709/245 |
| 7,246,133 | B2 | | 7/2007 | Velasco et al. |
| 7,426,576 | B1 | | 9/2008 | Banga et al. |
| 7,558,880 | B2 | | 7/2009 | Yoshimoto |
| 7,596,611 | B1 | * | 9/2009 | Satish ..................... H04L 67/14 709/223 |
| 7,620,953 | B1 | * | 11/2009 | Tene ...................... G06F 9/5077 709/203 |
| 7,669,202 | B1 | * | 2/2010 | Tene ................... G06F 9/45533 718/1 |
| 9,164,750 | B2 | * | 10/2015 | Arpirez ..................... G06F 8/65 |
| 9,305,159 | B2 | * | 4/2016 | Fanton .................... G06F 21/10 |
| 2006/0005240 | A1 | * | 1/2006 | Sundarrajan et al. .......... 726/15 |
| 2006/0090097 | A1 | * | 4/2006 | Ngan .................. G06F 11/1438 714/6.12 |
| 2006/0143703 | A1 | * | 6/2006 | Hopen ................ G06F 21/6218 726/15 |
| 2008/0034418 | A1 | * | 2/2008 | Venkatraman et al. ........ 726/15 |
| 2008/0034419 | A1 | * | 2/2008 | Mullick et al. ................. 726/15 |

(Continued)

*Primary Examiner* — Greg C Bengzon
(74) *Attorney, Agent, or Firm* — Schwegman Lundberg & Woessner, P.A.

(57) ABSTRACT

Techniques for conditional name resolution and configuration are provided. Calls made by applications to resolve hostnames through name resolution services are intercepted and processed unbeknownst to the applications. The calls are inspected for hostnames and the hostnames are lookup in a policy store for IP addresses. The IP addresses are supplied back to the applications as if IP addresses were provided by the name resolution services.

13 Claims, 3 Drawing Sheets

(56) References Cited

U.S. PATENT DOCUMENTS

| | | | |
|---|---|---|---|
| 2008/0043749 A1* | 2/2008 | Suganthi et al. | 370/395.52 |
| 2008/0201477 A1 | 8/2008 | Gray et al. | |
| 2008/0228899 A1* | 9/2008 | Plamondon | 709/219 |
| 2009/0112814 A1* | 4/2009 | Statia et al. | 707/3 |
| 2009/0249366 A1* | 10/2009 | Sen | G06F 9/5077 719/327 |
| 2010/0088398 A1* | 4/2010 | Plamondon | 709/220 |
| 2010/0175104 A1* | 7/2010 | Khalid | G06F 9/545 726/1 |
| 2010/0262970 A1* | 10/2010 | Havemose | G06F 8/62 718/104 |
| 2010/0262977 A1* | 10/2010 | Havemose | G06F 9/545 719/310 |
| 2010/0274910 A1* | 10/2010 | Ghanaie-Sichanie | H04L 9/3234 709/229 |
| 2011/0131342 A1* | 6/2011 | Pace et al. | 709/245 |

\* cited by examiner

TECHNIQUES FOR CONDITIONAL NAME RESOLUTION AND CONFIGURATION

RELATED APPLICATIONS

The present application is co-pending with, a non-provisional of, and claims priority to U.S. Provisional Application Ser. No. 61/247,259; entitled: "Conventional Name Resolution and Configuration," and filed on Sep. 30, 2009; the disclosure of which is incorporated by reference herein and below in its entirety.

BACKGROUND

In computer networks, name resolution refers to when users access resources using domain names or hostnames of those resources. Name resolution services translate the hostnames into a machine-readable address, referred to as an Internet Protocol (IP) address. This conversion or translation between a human readable name and the machine-readable address is governed by configuration settings that are applicable to an entire machine (all users and applications processing on those machines). This process includes Domain Name System (DNS) configuration settings and host files, which generally has static mappings of machine names to their corresponding IP addresses. Again, these configurations apply to the entire system.

A variety of problems arise with this traditional processing.

For example, with Virtual Private Networks (VPN's) a user accesses a resource and that resource is resolved via a name resolution configuration that applies to the VPN, which the user is connected to. At the same time, users may want to access resources outside the VPN using their domain names for those resources. Naming conflicts often arise in this situation because the two different resources are using different naming resolution services that are not compatible.

As another example, name resolution generally has to be done via network that the user is connected to. Sometimes the user may be using a wired network and other times the user may be using a wireless network. Typically, a user can use Dynamic Host Configuration Protocol (DCHP), which permits the name resolution settings to be pushed dynamically and automatically. However, if the network uses a static IP address, then the user is forced to manually edit the needed name resolution settings. This is cumbersome if the user switches from one network to another frequently.

In yet another case, when a developer is using a software test environment a particular resource may need to use a name resolution configuration for that resource that is different from the one that the machine is configured to provide. For example, in a proxy server development environment, in order to have a proxy client in the same machine, the proxy client should use configuration settings that are different from the one used by the proxy server on the same machine. This also cannot be done or not done easily.

Also, name resolution is generally performed based on the geographic location of the user so that the nearest name resolution server is used.

Usually, a user has to have administrator access rights to change the name resolution configuration settings manually.

Therefore, what is needed is an improved technique for name resolution and configuration.

SUMMARY

In various embodiments, techniques for conditional name resolution and configuration are presented. More specifically, and in an embodiment, a method for conditional name resolution and configuration is provided. A custom name resolving service is configured to intercept an Application Programming Interface (API) call made by an application from a processing environment of the application. The API call is directed to a request made by the application to a name resolution service for that name resolution service to resolve a hostname to an Internet Protocol (IP) address. Next, the custom name resolution service is configured to consult a policy store with the hostname to determine whether to pass through the hostname from the custom name resolution service to the name resolution service or to determine whether the hostname is to be resolved to the IP address via conditions defined in the policy store.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "name resolution service" as used herein is any conventional name resolution service that provides resolution of hostnames to Internet Protocol (IP) addresses for applications.

Conversely, a "custom name resolving service" as used herein refers to the techniques provided below. The custom name resolving service is integrated into the processing environment of applications and intercepts calls made by these applications to name resolution services. The applications are unaware of the processing associated with the custom name resolving service. Moreover, the name resolution services are unaware of the processing of the custom name resolving service.

Various embodiments of this invention can be implemented in existing network architectures. For example, in some embodiments, the techniques presented herein are implemented in whole or in part in the Novell® network, operating system (OS), and/or proxy server products, distributed by Novell®, Inc., of Provo, Utah.

Also, the techniques presented herein are implemented in machines, such as processor or processor-enabled devices. These machines are configured to specifically perform the processing of the methods and systems presented herein. Moreover, the methods and systems are implemented and reside within computer-readable storage media and are processed on the machines configured to perform the methods.

Of course, the embodiments of the invention can be implemented in a variety of architectural platforms, proxies, devices, operating and server systems, and/or applications. Any particular architectural layout or implementation presented herein is provided for purposes of illustration and comprehension only and is not intended to limit aspects of the invention.

Figure 1:
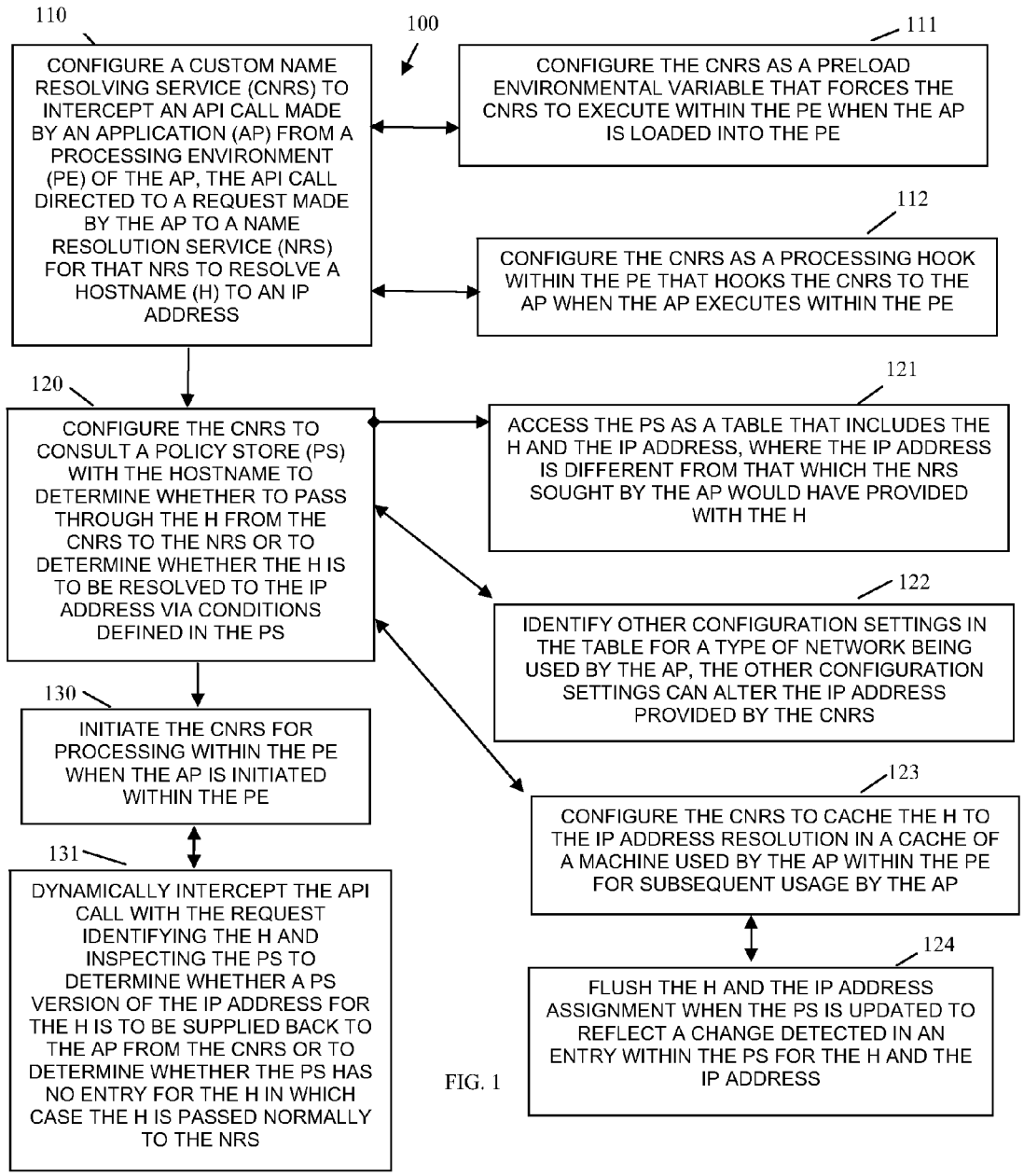
FIG. 1 is a diagram of a method for conditional name resolution and configuration, according to an example embodiment.
Figure 2:
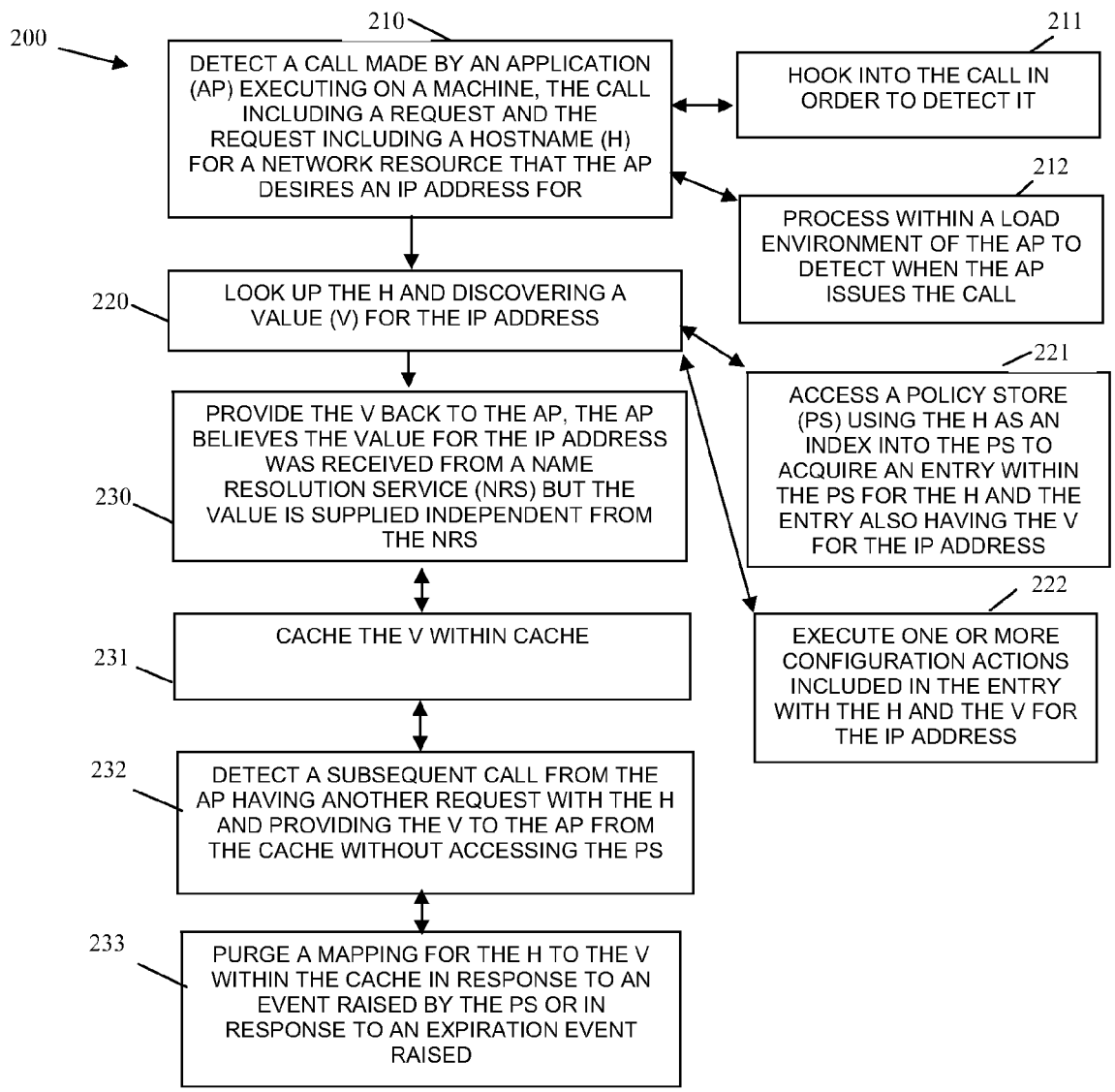
FIG. 2 is a diagram of another method for conditional name resolution and configuration, according to an example embodiment.
Figure 3:
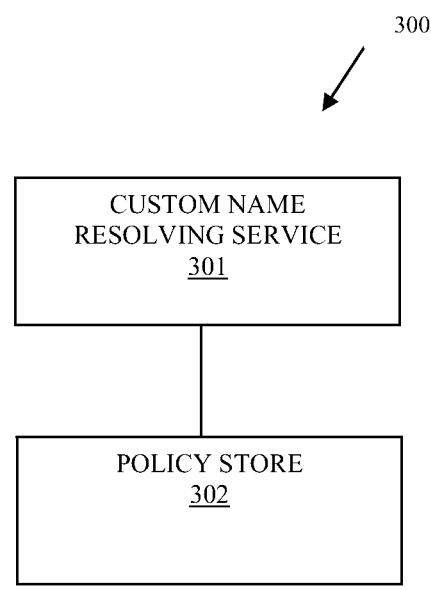
FIG. 3 is a diagram of a conditional name resolution configuration system, according to an example embodiment.

It is within this context that embodiments of the invention are now discussed within the context of FIGS. 1-3.

FIG. 1 is a diagram of a method 100 for conditional name resolution and configuration, according to an example embodiment. The method 100 (hereinafter "custom naming service") is implemented in a machine-accessible and computer-readable medium as instructions that execute on one or more processors (machines, computers, processors, etc.). The custom naming service is also operational over a network. The network may be wired, wireless, or a combination of wired and wireless.

At 110, the custom naming service configures a custom name resolving service to intercept an API call made by an application from a processing environment of the application. The API call is directed to a request that is being made by the application and directed to a name resolution service for that name resolution service to resolve a hostname (domain name) to an IP address for a protected resource being accessed by the application.

According to an embodiment, at 111, the custom naming service further configures the custom name resolving service as a preload environmental variable that forces the custom name resolving service to execute within the processing environment when the application is loaded into the processing environment for execution. This is useful with UNIX or LINUX based processing environments. For example, in LINUX the LD_PRELOAD environmental variable can be set with a reference to the custom name resolving service for the shell that executes the application. This ensures the custom name resolving service is executed with and tied to the execution environment of the application.

In another case, at 112, the custom naming service further configures the custom name resolving service as a processing hook within the processing environment that hooks the custom name resolving service to the application when the application executes within the processing environment. This is particular useful in WINDOWS® processing environments by using the hooking techniques to intercept the API call of the application being directed to the name resolution service.

At 120, the custom naming service configures the custom name resolving service to consult a policy store with the hostname. This is done to determine whether to pass the request with the hostname from the custom name resolving service through to the name resolution service. This is also done to determine whether the hostname (domain name) is to be resolved to the IP address via conditions and actions defined in the policy store.

In an embodiment, at 121, the custom naming service accesses the policy store as a table that includes the hostname and the IP address. The IP address in the policy store is different from that which the name resolution service would provide when it was sought by the application with the hostname.

In still another situation, at 122, the custom naming service identifies other configuration settings in the table for a type of network being used by the application (such as wired or wireless and the like). The other configuration settings can alter the IP address provided by the custom name resolving service based on these configuration settings. So, the IP address may be different for a wireless network than for a wired network. These configuration settings can be managed in the policy store and depending upon the needed configuration the proper IP address can be provided by the custom name resolving service.

In another case, at 123, the custom naming service configures the custom name resolving service to cache the hostname (domain name) to the IP address resolution in a cache of a machine (processor device) used by the application within the processing environment. This cached hostname and IP address resolution or mapping can be serviced from the cache by the custom name resolving service for subsequent usage by the application.

Continuing with the embodiment of 123 and at 124, the custom naming service flushes the hostname and the IP address assignment when the policy store is updated to reflect a change detected in an entry within the policy store for the hostname and the IP address. Policy can also dictate when the cache is refreshed or purged. This can improve the processing throughput of the custom naming service servicing the application with name resolution services.

According to an embodiment, at 130, the custom naming service initiates the custom name resolving service within the processing environment when the application is initiated within the processing environment.

Continuing with the embodiment of 130 and at 131, the custom naming service dynamically intercepts the API call with the request, which identifies the hostname (domain name), and inspects the policy store to determine whether a policy store version of the IP address for the hostname is to be supplied back to the application from the custom name resolving service or to determine whether the policy store has no entry for the hostname in which case the hostname and request are passed along normally to the name resolution service.

As further illustration of the processing that can be achieved via the custom naming service consider the following example processing scenario.

1. An application is started in an environment which has the custom naming service (instructions that execute on one or more processors and referred as "library" henceforth for the remainder of the discussion related to the FIG. 1).

2. This software component is loaded along with the user's application as a library and the library is used to intercept all API calls made by the application for name resolution.

3. Whenever the user's application invokes the APIs for name resolution, the library gets control of that invocation.

4. At this point, a policy store is consulted in order to ascertain if this name resolution request needs to be handled by this library or should it let the Operating System (OS) handle. This policy store can be just a flat file, a relational database, and/or a directory server. The policies include a condition and an action. For sample policies please refer to the table (below).

A. A condition could be based on any attribute that can be retrieved by the library during policy evaluation. Those attributes can be any of process name, process attributes, current user information, current time of day, network information, destination server/network information, and/or etc.

B. An action can be either of the following:
1. Consult a DNS server and provide the response.
2. Provide a statically mapped IP address for the queried hostname.

| Condition | DNS server |
| --- | --- |
| Destination name = "novell.com" | 164.99.201.1 |
| Destination name = "yahoo.com" | 192.87.56.23 |
| Application name = "groupwise.exe" | 164.99.201.1 |
| Network in use = "static" | 164.99.201.1 |
| Network in use = "dynamic or wireless" | default (use system defined) |

5. If none of the policies match then the request is bypassed and the name resolution request is handled by the OS itself using its name resolution service.

6. If there is a policy match then appropriate action is undertaken, which is either to contact the name server and provide the response or respond with an IP addresses that has been configured in the policy store for the particular hostname for which name resolution is requested.

7. This library has the capability to cache the DNS responses in order to make sure that the performance of the application is not compromised in this process.

This library can be deployed as a standalone application or it could be integrated into other products such as VPN clients.

At present within the industry, name resolution configurations are machine specific and one has to be an administrator in order to configure them. OS's consume these configurations and provide name resolution services with the help of one of their system services. With such a system in place it is not possible for a normal user to have name resolution configuration based on certain conditions (some have been listed above in the Background Section).

During VPN connection establishment, VPN clients append the private network's name resolution configuration to the client. This will be used in tandem with the preexisting name resolution configuration. There are two drawbacks with this approach. Firstly the VPN client needs administrator/root privileges in order to perform this modification. This becomes a problem in case of Secure Socket Layer (SSL) VPN where the VPN client needs to be installed and configured on the fly without elevated privileges. Also, if the VPN client terminates abruptly then the machine's configuration is left in an inconsistent state. With mechanism presented herein below and above these problems are overcome.

The problems described in this application are solved by modifying the name resolution services (e.g.: named in Linux, WINDOWS®, etc.). However, with the embodiments provided herein, there is no need to change the system services or the applications that perform that name resolution and the user need not have administrator privileges and can control his/her name resolution configuration without affecting other users in the system. Hence the approaches presented herein are novel and unique.

The proposed embodiments of this invention can also be provided to achieve user specific, certain condition specific name resolution without modifying system services and without the need for elevated system privileges.

FIG. 2 is a diagram of another method 200 for conditional name resolution and configuration, according to an example embodiment. The method 200 (hereinafter "custom name resolving service" is implemented in a machine-accessible and computer-readable storage medium as instructions that execute on one or more processors of a network server. The custom name resolving service is operational over a network. The network may be wired, wireless, or a combination of wired and wireless.

The custom name resolving service represents another and in some cases enhanced perspective of the custom naming service represented by the method 100 of the FIG. 1.

At 210, the custom name resolving service detects a call made by an application executing on a machine. The call includes a request and the request includes a hostname (domain name) for a network resource that the application desires to resolve into an IP address (machine-readable and recognized format).

According to an embodiment, at 211, the custom name resolving service hooks into the call in order to detect the call. Examples of this were provided above with reference to the method 100 of the FIG. 1.

In another case, at 212, the custom name resolving service processes within a load environment of the application to detect when the application issues a call. Again, this scenario was discussed above with reference to the method 100 of the FIG. 1.

At 220, the custom name resolving service looks up the hostname and discovers a value for the IP address. A custom resolution of the hostname is achieved based on configuration settings and policy implemented and evaluated by the custom name resolving service.

In an embodiment, at 221, the custom name resolving service accesses a policy store using the hostname as an index into the policy store to acquire an entry with the policy store for the hostname and the entry also has the IP address.

In some situations, at 222, the custom name resolving service executes one or more configuration actions included in the entry with the hostname and the value for the IP address. That is, depending on configuration settings (type of network, and others as listed above), the IP address can change.

At 230, the custom name resolving service provides the value for the IP address back to the application. The application believes the value for the IP address was received from a name resolution service but in fact the value is being supplied independent from the name resolution service and is provided by the custom name resolving service.

According to an embodiment, at 231, the custom name resolving service caches the value within a cache of the processing device of the application.

Continuing with the embodiment of 231 and at 232, the custom name resolving service detects a subsequent call from the application having another request with the hostname and then provides the value to the application from the cache without accessing the policy store.

Still continuing with the embodiments of 231 and 232 and at 233, the custom name resolving service purges a mapping for the hostname to the value within the cache in response to an event raised by the policy store or in response to an expiration event raised within the processing environment of the custom name resolving service and the application.

FIG. 3 is a diagram of a conditional name resolution configuration system 300, according to an example embodiment. The conditional name resolution configuration system 300 is implemented in a machine-accessible and computer-readable storage medium as instructions that execute on one or more processors (multiprocessor) and that is operational over a network. The one or more processors are specifically configured to process the components of the conditional name resolution configuration system 300. Moreover, the network may be wired, wireless, or a combination of wired and wireless. In an embodiment, the conditional name resolution configuration system 300 implements, among other things, certain aspects of the methods 100 and 200 represented by the FIGS. 1 and 2, respectively.

The conditional name resolution configuration system 300 includes a custom name resolving service 301 and a policy store 302. Each of these and their interactions with one another are now discussed in turn.

The custom name resolving service 301 is implemented in a computer-readable storage medium and is to execute on one or more processors of the network. Example processing features associated with the custom name resolving service 101 were presented in detail above with reference to the methods 100 and 200 of the FIGS. 1 and 2, respectively.

The custom name resolving service 301 is configured to intercept requests made by applications that are being directed to a name resolution service. The requests are intercepted in a manner that is transparent and unbeknownst to the applications.

Furthermore, the custom name resolving service 301 is configured to inspect the policy store 302 with the requests and determine whether IP addresses that satisfy the requests are to be supplied from the policy store 302 and when the IP addresses are not present in the policy store 302, the requests are passed through to the name resolution service for processing.

According to an embodiment, the custom name resolving service 301 is integrated into a processing environment with the applications.

In another case, the custom name resolving service 301 is configured to cache the IP addresses when supplied from the policy store 302 for subsequent usage by the custom name resolving service 301.

The policy store 302 is implemented in a computer-readable storage medium and is accessed and processed by the custom name resolving service 301 on the one or more processors of the network. Example aspects of the policy store 302 were presented in detail above with reference to the methods 100 and 200 of the FIGS. 1 and 2, respective.

The policy store 302 includes entries for hostnames and IP addresses and includes attributes and configuration settings (as described above at the end of the discussion related to the method 100 of the FIG. 1). This information permits the custom name resolving service 301 to resolve an IP address for a given hostname in a given context.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

processing, on a processor, a custom name resolving service based on an environment variable set in a shell representing a processing environment for an application when the application is initiated on a machine for execution by the processor, and configuring the custom name resolving service for intercepting an Application Programming Interface (API) call made by the application from the processing environment of the application from the processing environment of the processor when the API call is detected as being directed to a request made by the application to a name resolution service for that name resolution service for resolving a hostname to an Internet Protocol (IP) address of a protected resource being accessed by the application from the processing environment of the processor;

configuring, by the processor, the custom name resolution service for consulting a policy store with the hostname and determining whether to pass through the hostname from the custom name resolution service to the name resolution service and whether the hostname is resolved to the IP address by evaluating conditions defined in the policy store, wherein determining further includes determining to pass through the hostname from the custom name resolution service to the name resolution service when the hostname is not matched in the policy store, and wherein evaluating further includes evaluating at least one condition for current user information for a user associated with the application, and wherein other of the conditions include an application name for the application and a type of network in use, wherein configuring the custom name resolving service to consult further includes accessing the policy store as a table that includes the hostname and the IP address, where the IP address is different from that which the name resolution service sought by the application would have provided with the hostname, wherein configuring the custom name resolving service to consult further includes identifying other configuration settings in the table for a type of network being used by the application, the other configuration settings can alter the IP address provided by the custom name resolving service;

providing, by the custom name resolution service executing on the processor within the processing environment, custom name resolution for the application based on the configured and executing custom name resolution service, and wherein providing further includes providing the custom name resolution service within the Operating System (OS) of the processor without modifying system services and applications provided by the OS for name resolution and without setting administrative privileges within the OS; and initiating the custom name resolution service for processing within the processing environment when the application is initiated within the processing environment and providing through the initiated custom name resolution service an ability for the user to access external resources to a Virtual Private Network (VPN), wherein the external VPN resources having naming conflicts with at least some resources of a VPN associated with the OS.

2. The method of claim 1, wherein configuring the custom name resolving service to consult further includes configuring the custom name resolving service to cache the hostname to the IP address resolution in a cache of a machine used by the application within the processing environment for subsequent usage by the application.

3. The method of claim 2, wherein configuring the custom name resolving service to cache further includes flushing the hostname and the IP address assignment when the policy store is updated to reflect a change detected in an entry within the policy store for the hostname and the IP address.

4. The method of claim 1 further comprising, dynamically intercepting the API call with the request identifying the hostname and inspecting the policy store to determine whether a policy store version of the IP address for the hostname is to be supplied back to the application from the custom name resolving service or to determine whether the policy store has no entry for the hostname in which case the hostname is passed normally to the name resolution service.

5. A method, comprising:
detecting, by a processor, a call made by an application executing on the processor within a processing environment after initiating the processing on the processor within a shell for the application is initiated on the processor, the shell representing the processing environment, the call including a request and the request including a hostname for a protected network resource that the application desires an Internet Protocol (IP) address for;
looking up, by the processor, the hostname and discovering a value for the IP address, wherein looking UP further includes accessing a policy store as a table that includes the hostname and the IP address, where the IP address is different from that which the call sought by the application would have provided with the hostname, wherein looking up further includes identifying other configuration settings in the table for a type of network being used by the application, the other configuration settings can alter the IP address provided; and
providing, by the processor, the value back to the application, the application believes the value for the IP address was received from a name resolution service but the value is supplied independent from the name resolution service based on locating a match for the hostname in the policy store having an entry for the value, wherein providing further includes matching the hostname by evaluating conditions and at least one condition for a current time of day when the call was detected and other of the conditions an application name for the application and a type of network in use and thereby providing custom name resolution within the processing environment on the processor for the application that is different from what the Operating System (OS) of a machine having the processor is configured to provide, and processing the custom name resolution within the OS without modifying system services and applications provided by the OS for name resolution and without setting administrative privileges within the OS, and providing through the custom name resolution an ability for a user to switch between different types of networks without experiencing naming conflicts for at least some resources being accessed by the user.

6. The method of claim 5, wherein looking up further includes accessing the policy store using the hostname as an index into the policy store to acquire an entry within the policy store for the hostname and the entry also having the value for the IP address.

7. The method of claim 5, wherein looking up further includes executing one or more configuration actions included in the entry with the hostname and the value for the IP address.

8. The method of claim 5, wherein providing further includes caching the value within cache.

9. The method of claim 8, wherein caching further includes detecting a subsequent call from the application having another request with the hostname and providing the value to the application from the cache without accessing the policy store.

10. The method of claim 8, wherein caching further includes purging a mapping for the hostname to the value within the cache in response to an event raised by the policy store or in response to an expiration event raised.

11. A multiprocessor-implemented system, comprising:
one or more processors of a network including a custom name resolving service implemented in a non-transitory computer-readable storage medium as executable instructions that and to execute on the one or more processors of the network; and
a non-transitory computer readable storage medium including a policy store implemented in a computer-readable storage medium and accessible to and accessed processed by the custom name resolving service from the one or more processors over of the network; the custom name resolving service configured to intercept requests made by an application, executing on a processor of a machine within a processing environment, and the custom name resolving service initiated on the machine for processing by the processor when a shell representing processing environment and having the application is initiated on the processor based on an environment variable set that identifies the custom name resolving service, and the requests are directed to a name resolution service in a manner that is unknown to the applications, wherein the name resolution service is configured within an Operating System of the machine to provide name resolution services to the application, the requests are for protected network resources, the custom name resolving service is further configured to inspect the policy store with the requests and determine when Internet Protocol (IP) addresses that satisfy the requests are to be supplied from the policy store and when the IP addresses are not present in the policy store passing the requests through to the name resolution service for processing based on whether the entries exists or do not exists in the policy store for the requests directed to the protected network resources, and wherein the custom name resolving service is further configured to evaluate conditions when inspecting the policy store with the requests for determining the IP address and at least one condition for process attributes of the applications and providing by the custom name resolving service custom name resolution to the application within the processing environment on the processor, and wherein the custom name resolving service processes within the Operating System without modifying system services and applications provided by the Operating System for name resolution and without setting administrative privileges within the Operating System, and wherein some of the conditions include an application name for the application and a type of network in use, and wherein the policy store is a table that includes a hostname and the IP address, where the IP address is different from that which the name resolution service sought by the application would have provided with the hostname, and identify other configuration settings in the table for the type of network being used by the application, the other configuration settings can alter the IP address provided by the custom name resolving service, and provide through processing of the custom name resolving service a user of the Operating System an ability to access external resources of the Operating System without experiencing naming conflicts for those external resources.

12. The system of claim 11, wherein the custom name resolving service is integrated into the processing environment of the application.

13. The system of claim 11, wherein the custom name resolving service is configured to cache the IP addresses when supplied from the policy store for subsequent usage by the custom name resolving service.

* * * * *

UNITED STATES PATENT AND TRADEMARK OFFICE
CERTIFICATE OF CORRECTION

| | | |
|---|---|---|
| PATENT NO. | : 9,755,886 B2 | Page 1 of 1 |
| APPLICATION NO. | : 12/607149 | |
| DATED | : September 5, 2017 | |
| INVENTOR(S) | : Ananda et al. | |

It is certified that error appears in the above-identified patent and that said Letters Patent is hereby corrected as shown below:

In the Claims

In Column 9, Line 32, in Claim 5, delete "UP" and insert --up-- therefor

In Column 10, Line 25, in Claim 11, delete "computer readable" and insert --computer-readable-- therefor In Column 10, Line 30, in Claim 11, after "network;", insert --¶--

Signed and Sealed this
Fourteenth Day of April, 2020

Andrei Iancu
*Director of the United States Patent and Trademark Office*